United States Patent
Hayashi

(10) Patent No.: US 7,327,375 B2
(45) Date of Patent: Feb. 5, 2008

(54) CONTROL PROGRAM FOR DISPLAY APPARATUS

(75) Inventor: Tomoyuki Hayashi, Tokyo (JP)

(73) Assignee: Sega Corporation, Tokyo (JP)

( * ) Notice: Subject to any disclaimer, the term of this patent is extended or adjusted under 35 U.S.C. 154(b) by 0 days.

(21) Appl. No.: 10/844,760

(22) Filed: May 13, 2004

(65) Prior Publication Data
US 2004/0263532 A1    Dec. 30, 2004

(30) Foreign Application Priority Data
May 13, 2003    (JP)    ............... 2003-134986

(51) Int. Cl.
G09G 5/00    (2006.01)
(52) U.S. Cl. ............ 345/646; 345/629; 345/634; 345/647; 345/648; 345/652; 345/656; 345/678; 382/293; 382/296
(58) Field of Classification Search ............ 382/296, 382/293; 345/646–648, 652, 656, 678
See application file for complete search history.

(56) References Cited

U.S. PATENT DOCUMENTS 5,495,564 A * 2/1996 Takahashi .......... 345/639
5,848,201 A * 12/1998 Kajiwara .......... 382/296
6,016,150 A * 1/2000 Lengyel et al. ......... 345/426

FOREIGN PATENT DOCUMENTS

JP    7312721    11/1995
JP    9305795    11/1997

* cited by examiner

Primary Examiner—Kee M. Tung
Assistant Examiner—Antonio A Caschera
(74) Attorney, Agent, or Firm—Jordan and Hamburg LLP

(57) ABSTRACT

As characters move, building are rotated and deformed, then, a powerful expression as if the characters moved lively and freely in three-dimensional space.

The game machine stores a first image plane for displaying a ground, a second plane for displaying images of upper surfaces of solid bodies of buildings, a third image plane for displaying the background in the graphic memory. A sprite image to be pasted on side surfaces of the buildings and other solid bodies is stored in the graphic memory.

Thereby, realistic image expression is realized by displaying solid bodies with the same height.

4 Claims, 25 Drawing Sheets

(a)  (b)

CONTROL PROGRAM FOR DISPLAY APPARATUS

BACKGROUND OF THE INVENTION

The present invention relates to a control program for display apparatus.

Relatively high-performance central processing unit or an image processing processor is necessary for an image display apparatus such as computer game machine when a moving solid body is to be displayed.

While, when the image display apparatus is limited in hardware performance or high-performance processor is not available, pretended solid bodies are expressed by sprite or other image processing methods of not so heavy calculation.

Sprite is an image processing method that a two-dimensional image pattern (sprite image) is prepared, then the image is displayed at a predetermined position. The sprite image is enlarged, diminished or rotated so as to express a pretended solid body.

There are some image processing methods of not so heavy calculation for expressing solid bodies. First of them is shown for example in Japanese Patent Application 09-305795, that is, a symbol body moving between right and left walls is expressed by changing extraction or contraction ratio of the walls in response to a view point of the symbol body.

The second is shown for example in the Japanese Patent Application 07-312721, that is, an image frame displayed is transformed into a sprite image before the image frame is displayed, the sprite image is pasted on various surfaces of a polyhedron and the polyhedron is rotated.

In order to realize the conventional image processing method, an image processing machine for executing the image processing method freely positions four vertexes of the sprite image. However, since the image processing machine must be of high performance in image processing, the construction becomes complicated and the cost increases.

So, in another conventional machine which must be of low price such as portable game machine, three vertexes of a sprite image can be positioned for deforming a rectangle into a parallelogram or a rhombus. The conventional machine of this type cannot execute the conventional image processing method.

BRIEF SUMMARY OF THE INVENTION

The present invention is invented to solve the above conventional problems and has an object to realize a realistic image expression in an image. display apparatus which cannot freely position four vertexes of a sprite image.

In accordance with the present invention, a control program for a display apparatus which comprises a background image storing means for storing a background image displayed with rotation around a reference point by a designated angle, a sprite image storing means for storing a sprite image for two-dimensional image of parallelogram, which is displayed with deformation defined by coordinate of three vertexes in a display, and a control means for outputting said background image and said sprite image to said display apparatus, one of said background image and said sprite image being superimposed upon the other according to a predetermined displaying priority order, comprises a step of setting coordinate of a first and a second points in said background image, a step of rotating said background image around said reference point by a designated angle so as to generate a rotated background image, a step of calculating a third and fourth point in said rotated background image corresponding to said first and second points, respectively, according to said designated angle, a step of calculating a fifth point which is shifted by a predetermined distance from said third point in a predetermined direction, and a step of deforming and displaying said sprite image so that three of said vertexes of said sprite image fall on said third, fourth and fifth points.

Thereby, the four vertexes of the sprite image can be freely positioned so as to realize an image expression of high reality.

As for the control program according to the present invention, the step of sprite image deforming and displaying said sprite image may comprise a step of determining a first vertex among said vertexes of said parallelogram and second and third vertexes adjacent to said first vertex, and a step of deforming said sprite image by determining drawing position of pixels of said sprite image according to an angle between a first vector from said first vertex to said second vertex and a second vector from said first vertex to said third vertex, and drawing position of pixels of said sprite image being determined according to an angle between a vector from said third vertex to fifth vertex and a vector from said third vertex to said fifth vertex.

The image display apparatus for executing the control program of the present invention may further comprises a second background image storing means for storing a second background image, and further comprises a step of rotating said second back ground image similarly to said background image and a step of dislocating said second background image by a predetermined distance along a direction of said two vertexes of said background image.

A control program according to the present invention may further comprises a step of diminishing said background image rotated in a predetermined direction by a predetermined magnification.

In a storage medium according to the present invention, a program code executable by a computer of said control program is stored.

The storage medium stores information (mainly digital data and program) by means of some physical means, for required performance of computers, special purpose processor and other processing devices In sum, the storage medium includes any means for downloading a program into a computer for executing a predetermined function, for example, flexible disk, hard disk drive, magnetic tape, optical magnetic disk, compact disk (CD), CD-ROM, CD-R/RW, DVD-RAM, DVD-R, smartmedia, phase change optical disk (PD), mini-disk (MD), DCC, ROM cartridge, RAM cartridge with a battery-backup, flash memory cartridge, nonvolatile RAM cartridge etc.

Further, the present invention includes a communication medium for transfer the control program from a host computer through a communication line (communication line for public use, leased data line, satellite communication line and so forth).

BRIEF DESCRIPTION OF THE DRAWINGS

Accompanying the specification are figures which assist in illustrating the embodiments of the invention, in which.

DETAILED DESCRIPTION OF THE INVENTION

Preferred embodiments of the present invention is described, hereafter.

First Embodiment

First, the first embodiment of a control program according to the present invention, applied to an image display apparatus of a portable game machine for consumers is described with reference to the attached drawing.

Figure 1:
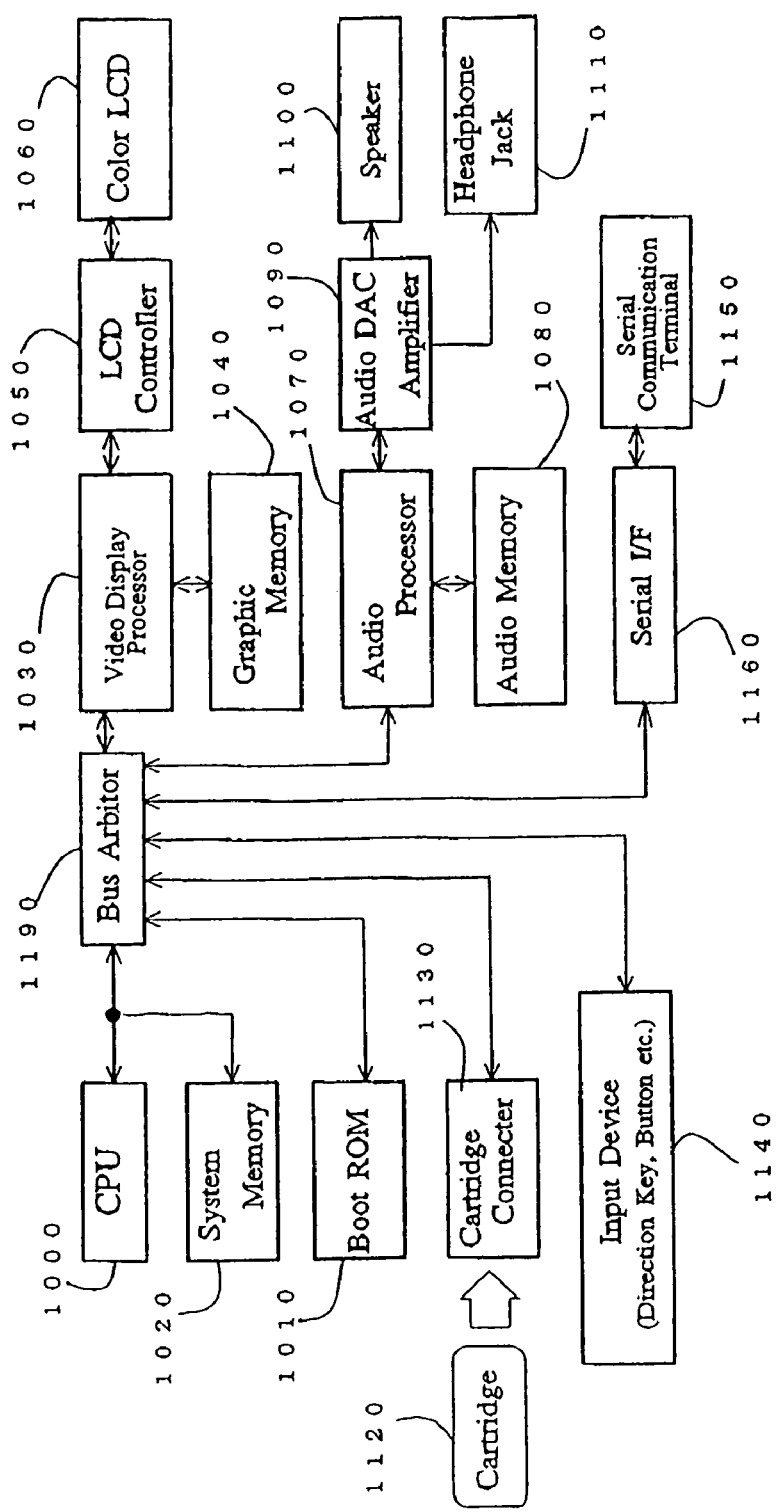
FIG. 1 is a block diagram showing an image display apparatus in which a control program according to the present invention is executed.
Figure 2:
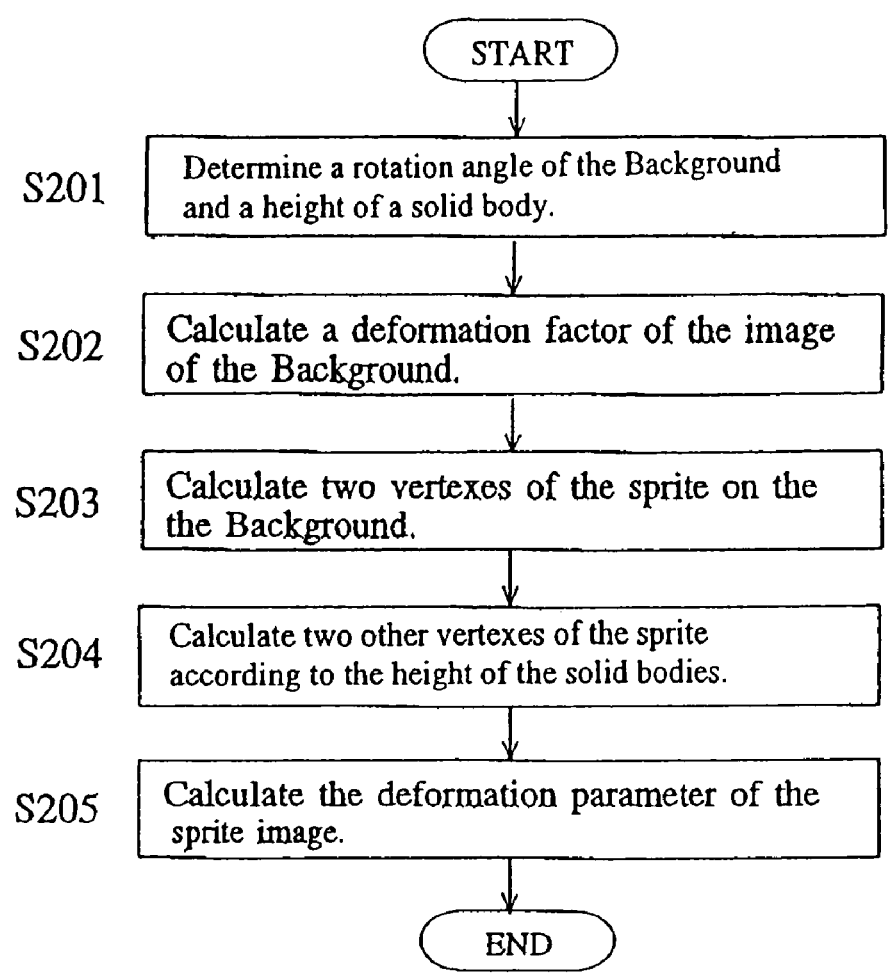
FIG. 2 is a flowchart showing the first embodiment according to the present invention.
Figure 3:
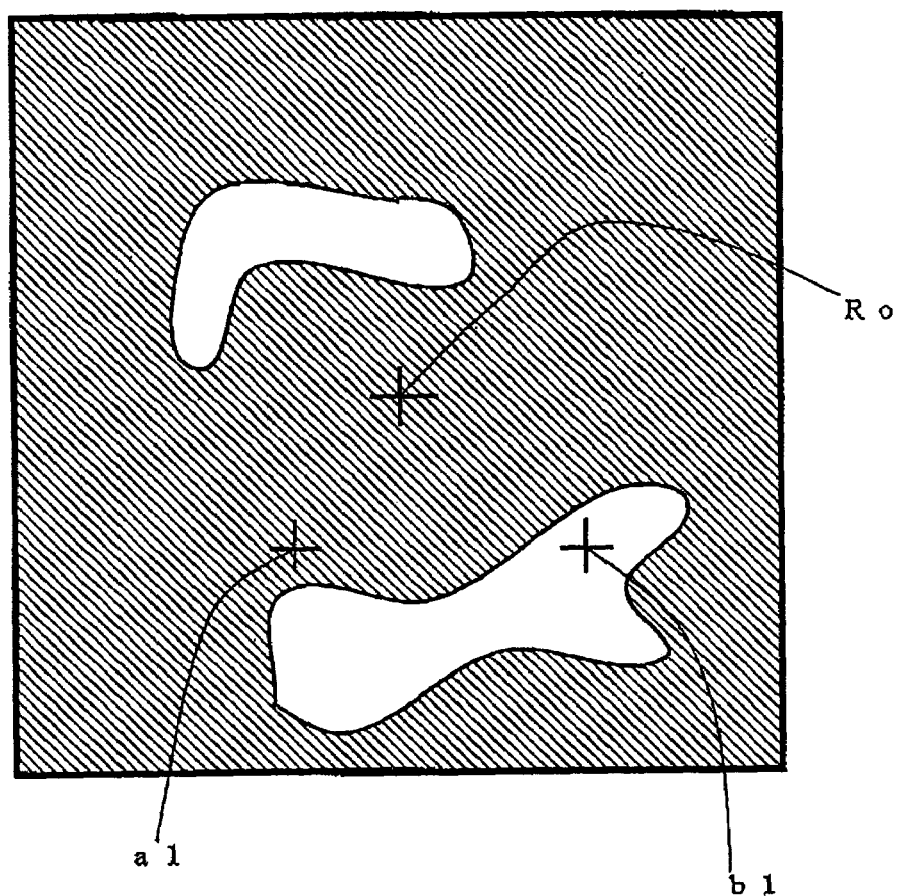
FIG. 3 is a view showing a background image processed by the control program in FIG. 2.
Figure 4:
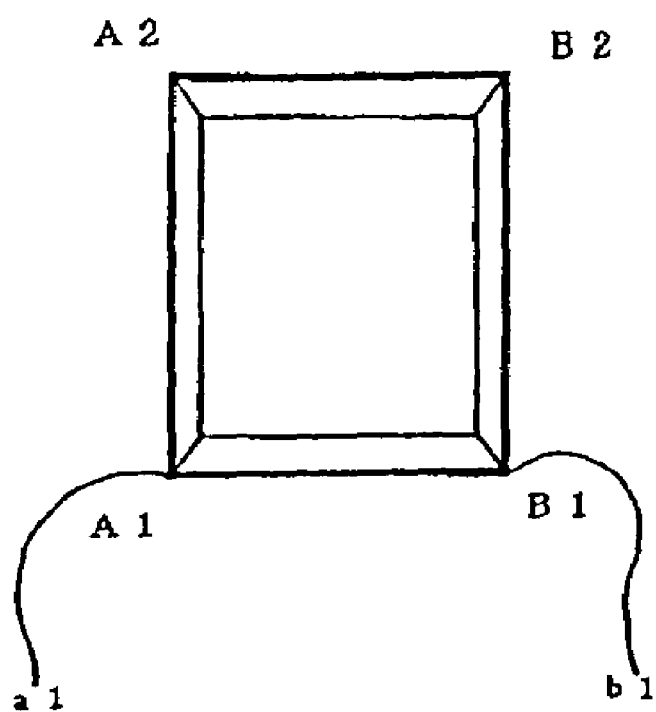
FIG. 4 is a view showing a sprite image processed by the control program in FIG. 2.
Figure 5:
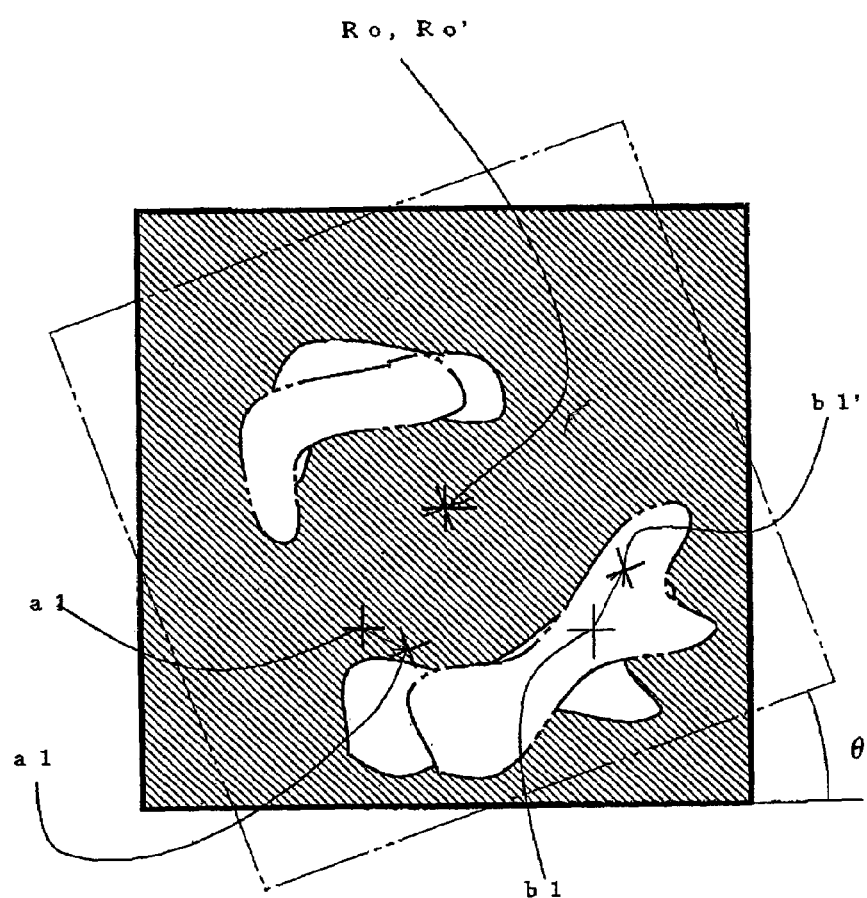
FIG. 5 is a view showing the background image in FIG. 3 rotated by the step S202 in FIG. 2.
Figure 6:
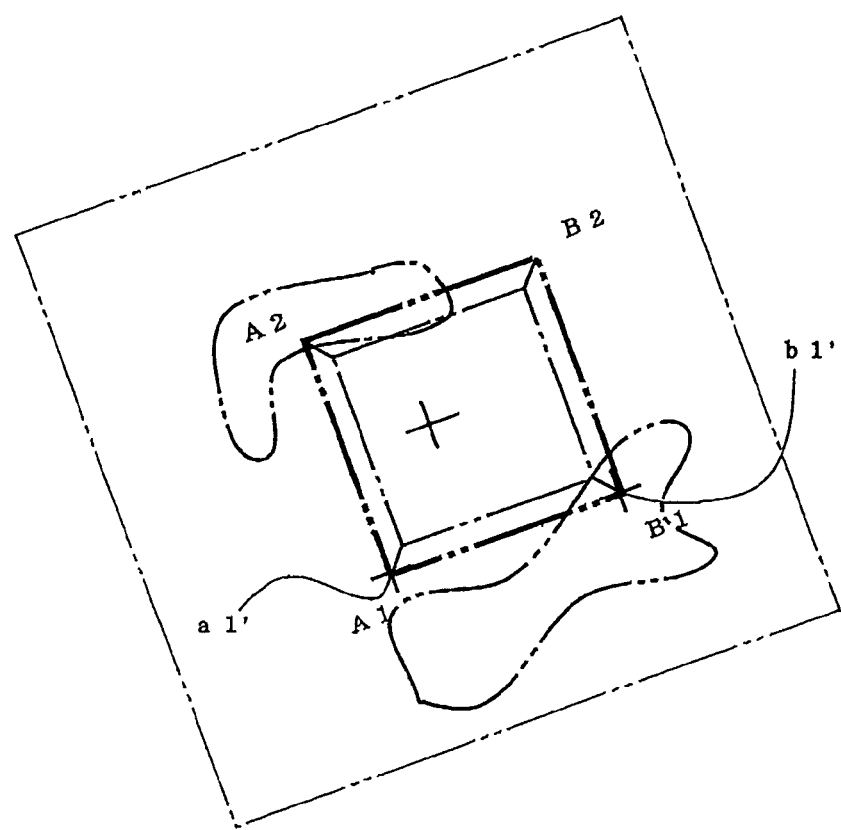
FIG. 6 is a view showing the background image in FIG. 5 upon which the sprite image is superimposed without deformation.
Figure 7:
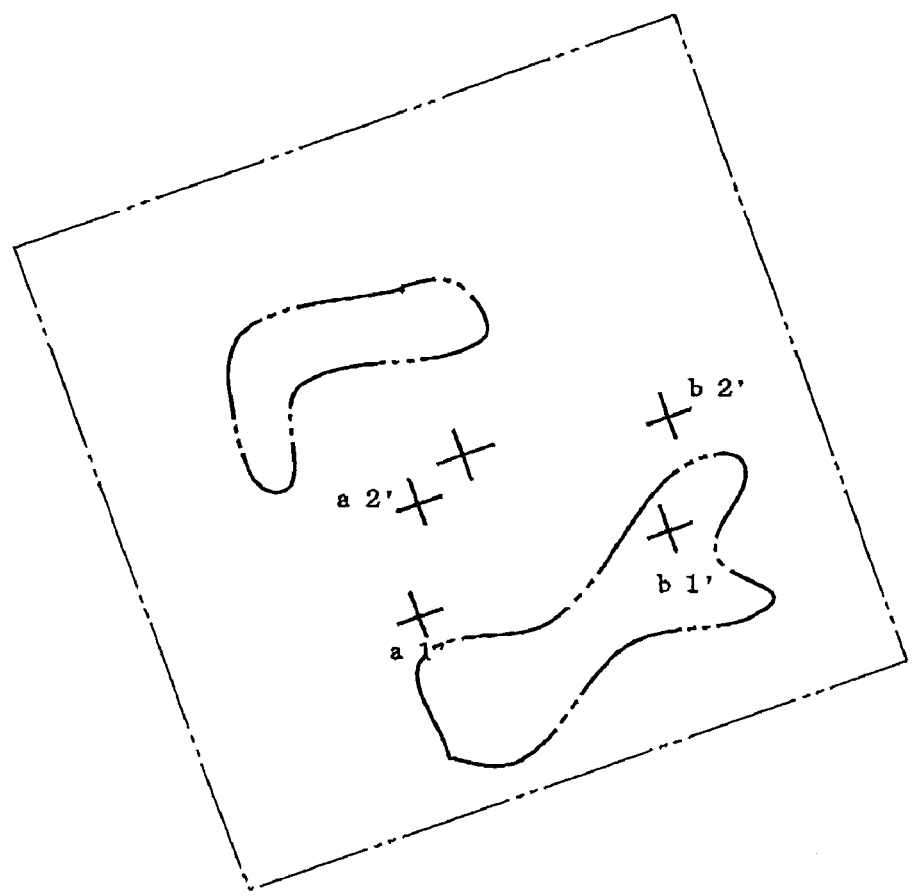
FIG. 7 is a view showing the two vertexes and the shifted vertexes obtained by the step S204 on the background image rotated in FIG. 5.
Figure 8:
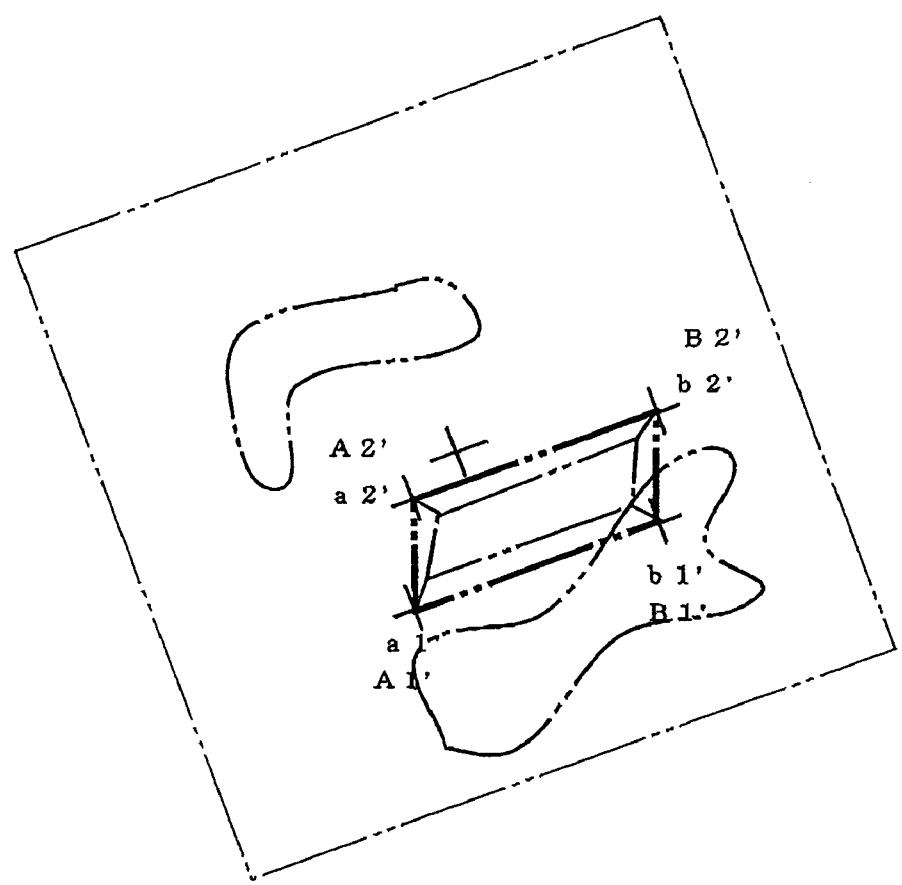
FIG. 8 is a view showing the sprite image fitting the four vertexes obtained in FIG. 7.

FIG. 1 is a block diagram showing an image display apparatus in which a control program according to the present invention is executed. FIG. 2 is a flowchart showing the first embodiment according to the present invention. FIG. 3 is a view showing a background image processed by the control program in FIG. 2. FIG. 4 is a view showing a sprite image processed by the control program in FIG. 2. FIG. 5 is a view showing the background image in FIG. 3 rotated by the step S202 in FIG. 2, FIG. 6 is a view showing the background image in FIG. 5 upon which the sprite image is superimposed without deformation. FIG. 7 is a view showing the two vertexes and the shifted vertexes obtained by the step S204 on the background image rotated in FIG. 5. FIG. 8 is a view showing the sprite image fitting the four vertexes obtained in FIG. 7.

In FIG. 1, an image display apparatus has a CPU 1000 for controlling the image display apparatus, a boot ROM 1010 for storing a program which initiates the image display apparatus and a system memory 1020 for storing data and programs executed by the CPU 1000.

The image display apparatus includes a video display processor 1030 for generating and controlling an image to be displayed and a graphic memory for storing a material image of images to be generated or generated images. The video display processor 1030 drives a LCD controller 1050 so as to display an image on a display portion 1060 such as color LCD (liquid crystal display).

The image display apparatus includes an audio processor 1070 for generating sound and an audio memory 1080 for storing audio data to be generated. The audio processor 1070 generates a digital sound signal according to the data stored in the audio memory 1080. The digital signal is converted by a audio DA amplifier 1090 into an analog signal as well as amplified to an adequate level.

The analog signal from the audio DA amplifier 1090 is input to a speaker 110, a headphone (not shown) connected to a headphone jack 1110 and so forth for outputting sound.

The image display apparatus includes a cartridge connector 1130 for connecting a cartridge 1120 as a memory medium. A game program and data are read from the cartridge connector 1130 into the system memory 1020, graphic memory 1040 and audio memory 1080.

The image display apparatus includes an input device 1140 of direction key, button etc. A player operates various operation by the input device 1140 for executing a game.

The image display apparatus includes a serial communication terminal 1150 for transmitting and receiving a game program and data with other machines for game or other purpose. A serial interface 1160 is provided for connecting the serial communication terminal 1150 with other components of the image display apparatus.

Therefore, it is possible for the player to play with or against other players by the image display apparatus through the serial communication terminal 1150.

The image display apparatus includes a bus arbiter 1190 for a communication arbitration among CPU 1000 and other components.

Therefore, the program and data are properly read out and written into.

The memory medium is not limited to a cartridge 1120. A floppy disk drive etc. may be provided in the image display apparatus for applying a floppy disk and other medium as a memory medium.

When the boot program is stored in the floppy disk etc. the boot ROM can be omitted.

The display portion 1106 is not limited to the color LCD, any display means such as CRT, plasma display, DLP-type projector etc. may be applied as the display portion.

The communication with another game machine is not limited to the serial communication, parallel communication can be applied. Either radio or wire communication can be applied.

The image display apparatus is not limited to a game machine, a general purpose computer, a display portion of various communication apparatus, a display portion of handy electronic machine, various household electric appliance, controller unit for remote control of household electric appliance, a display portion of various office machine, various indoor or outdoor display systems, watch or other personal ornaments, a display portion of various security systems, display device for traffic sign or other public signs, and various display means.

When the image display apparatus is a general purpose computer in which the control program according to the present invention is executed, a program is read by the general purpose computer, which is executable by the general purpose computer and includes program codes for executing each step of the control program.

A program of the general purpose computer for displaying an image is loaded from a ROM within the general purpose computer, a memory medium readable by the general purpose computer or a server through a network.

A control program shown in FIG. 2 is executed in the game machine in FIG. 1.

In FIG. 2, the control program executes the following steps from S201 to S205.

Step S201: A rotation angle θ of first background image is set by a displacement of a character etc. and by a movement of a view point. A height of solid bodies are determined and the bodies are put on the background and positions of a sprite image are set.

The first background image is for example an image in FIG. 3. A reference point (for example, the center Ro) is defined in the first background image. The position of the sprite image is given by two points a1 and b1.

Figure 25:
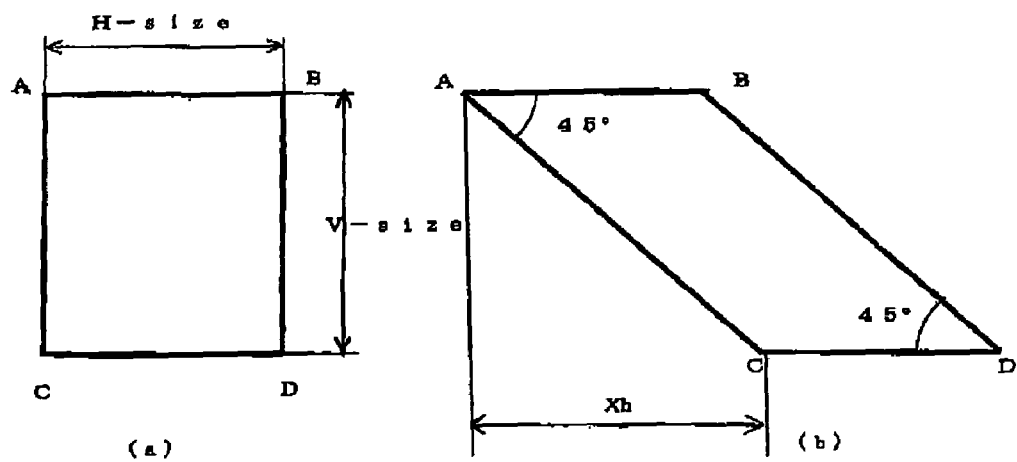
FIG. 25 is a view showing an example of sprite image.

As shown in FIG. 25, the sprite image (shown by references A, B, C and D corresponding to the vertexes of clockwise order from the upper left) of the present embodiment is defined by the following data.

Reference Coordinate: A start point of drawing of the sprint image, usually the upper left vertex A.

H-size: A horizontal width, or number of pixels in horizontal direction, of the original sprite image.

V-size: A vertical height, or number of pixels in vertical direction, of the original sprite image.

Horizontal deformation parameter (Xh, Yh); a pixel is drawn at a position vertically shifted by Yh from the end of Xh pixels drawn in horizontal direction.

Vertical deformation parameter (Xv, Yv): a pixel is drawn at a position horizontally shifted by Xv from the end of Yv pixels drawn in vertical direction.

For example, when (Xh, Yh)=(1,0) and (Xv, Yv)=(0,1), the sprite image is deformed into a square or a rectangle. If H-size=V-size, the sprite image becomes a square.

When (Xh, Yh)=(1,0), (Xv, Yv)=(1,1), a deformation is performed so that a vertical side line is inclined by 45 degrees. A sprite image is deformed so that a vertical side line is inclined by 45 degrees. A sprite image shown in FIG. 25 (*a*) is deformed as shown in FIG. 25 (*b*). Here, the deformation is (Xh, Yh)=(1,0), (Xv, Yv)=(0,0).

For example, the sprite image to be put on the background image is rectangle as shown in FIG. 4, and is deformed into a parallelogram (including a rectangle) of various size corresponding to a rotation of the background image and to a height of solid bodies.

The lower two vertexes of the sprite image is designated as A1 and B1, and the upper two vertexes as A2 and B2. The positioning points a1 and b1 give the coordinate where the vertexes A1 and B1 are positioned.

Step S202: After step S201, a deformation parameter of the background image is calculated. The deformation parameter corresponds to the angel of the ground set in the step S201. As shown in FIG. 5, the background image is rotated around the reference point Ro by the angle θ set by the step S201.

Step S203: After step S202, two points a1' and b1' are set in the rotated background image on which the sprite image is positioned.

Step S204: Other two points on which the sprite image is positioned are calculated according to the height of the solid body determined in the step S201.

The background image on which the sprite image is overlapped with the points A1 and B1 put on the points a1' and b1', respectively, is shown in FIG. 6, disregarding the height of the solid bodies.

The coordinates of other vertexes of the sprite image are given by points a2' and b2' shifted from the points a1' and b1', respectively, in Y-direction (vertical in the displayed image) by the height of the solid bodies, as shown in FIG. 7.

Step S205: after step S204, the sprite image is deformed so that point Ro and vertexes, A1, B1, A2 and B2 are put just on the points ro', a1', b1', a2' and b2', respectively.

Since the video display processor 1030 can generate the sprite image of parallelogram (including rectangle), it is possible to deform the sprite image in high speed in the processing above.

As mentioned above, three-dimensional expression of high reality and high speed is realized using only one background image and a sprite image with simple deformation.

Second Embodiment

Next, the second embodiment of the control program for the image display apparatus according to the present invention is described with reference to the attached drawings. In the second embodiment, two or more background images are used so that more realistic expression of solid body is possible.

Figure 9:
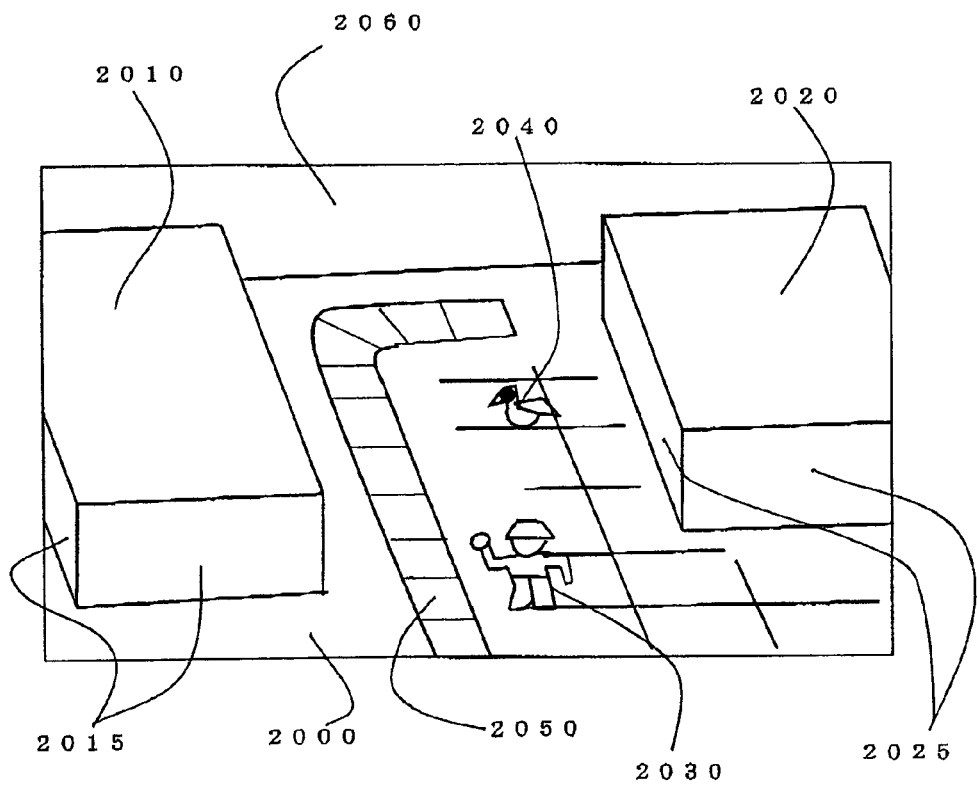
FIG. 9 is a view showing an image displayed by the second embodiment.
Figure 10:
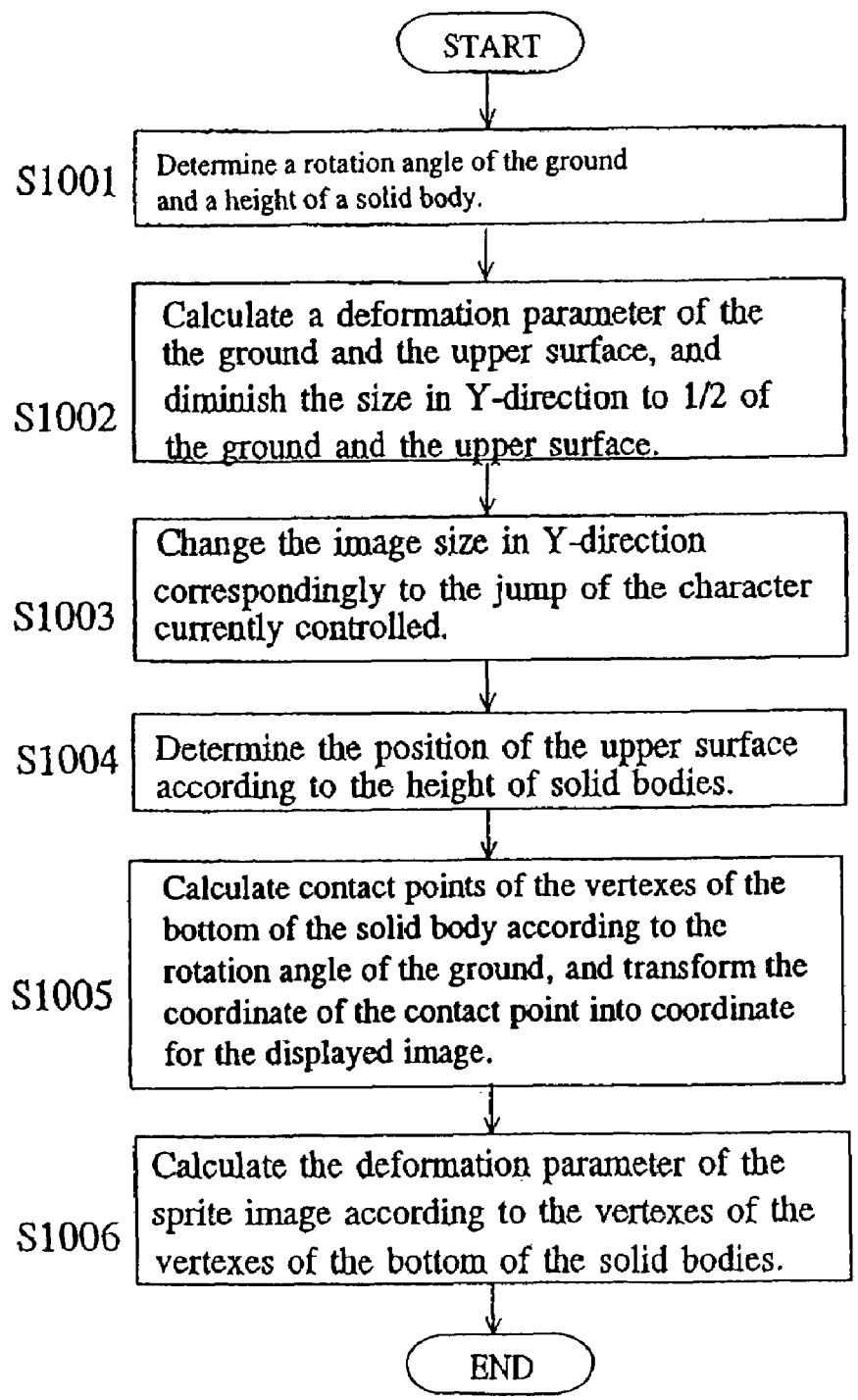
FIG. 10 is a flowchart showing the second embodiment of the control program according to the present invention.
Figure 11:
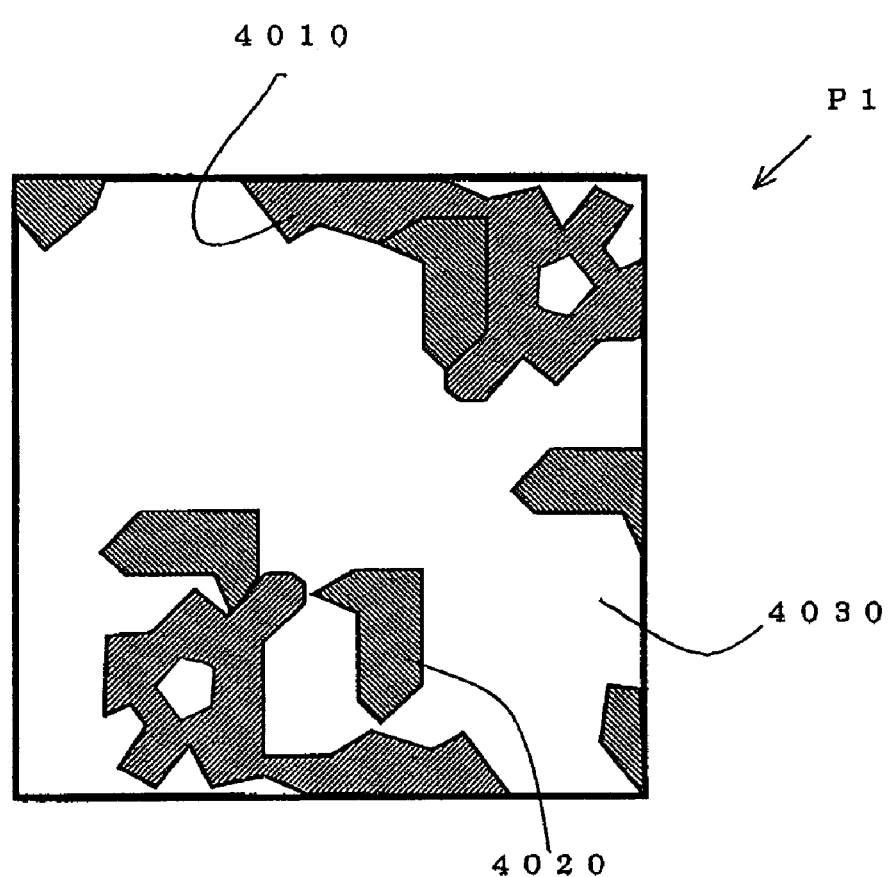
FIG. 11 is a view showing the first background image processed by the control program in FIG. 10.
Figure 12:
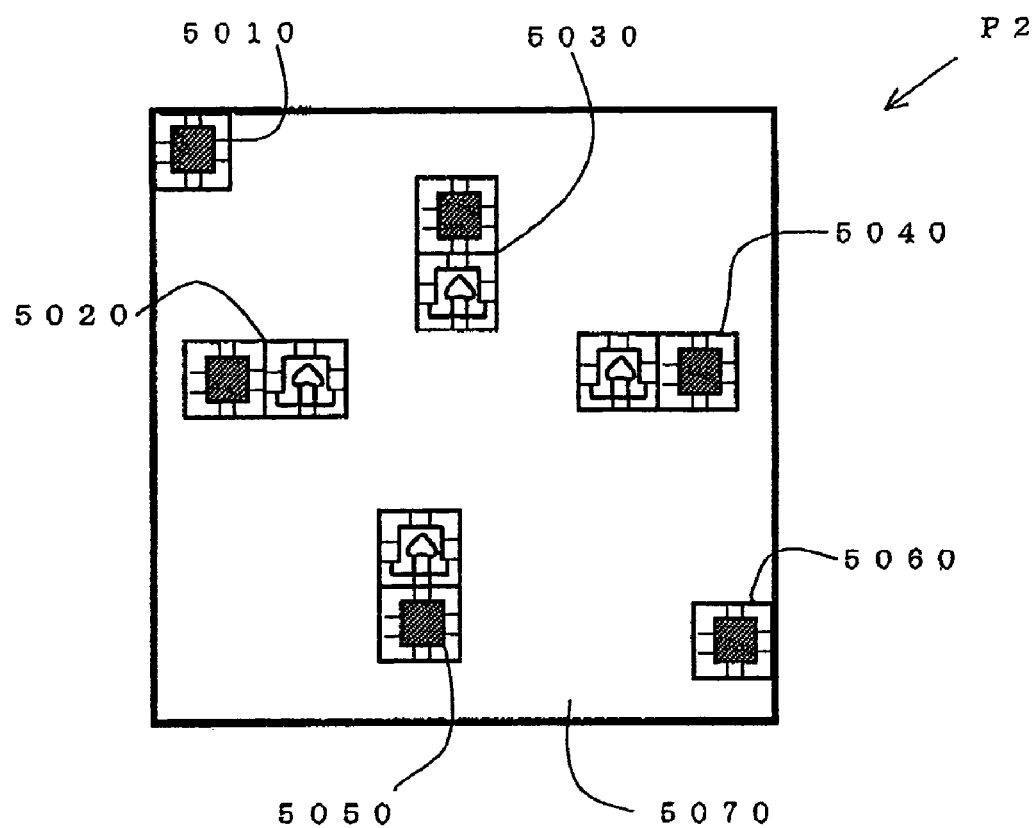
FIG. 12 is a view showing the second background image processed by the control program in FIG. 10.
Figure 13:
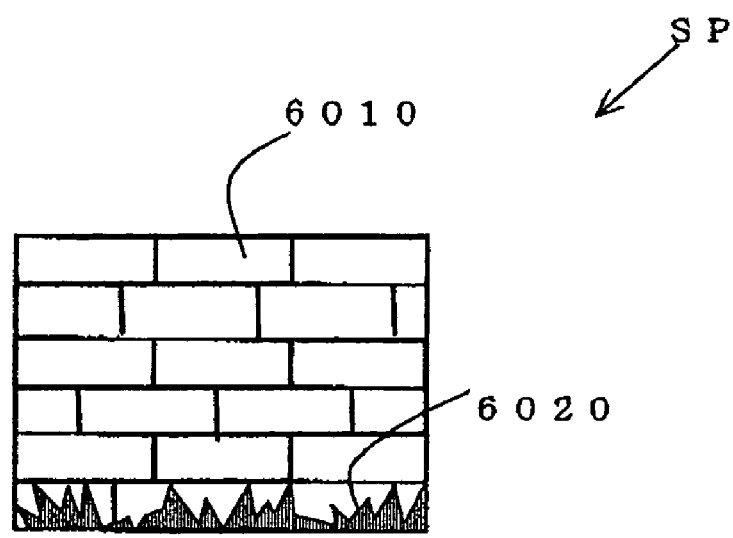
FIG. 13 is a view showing a sprite image processed by the control program in FIG. 10.
Figure 14:
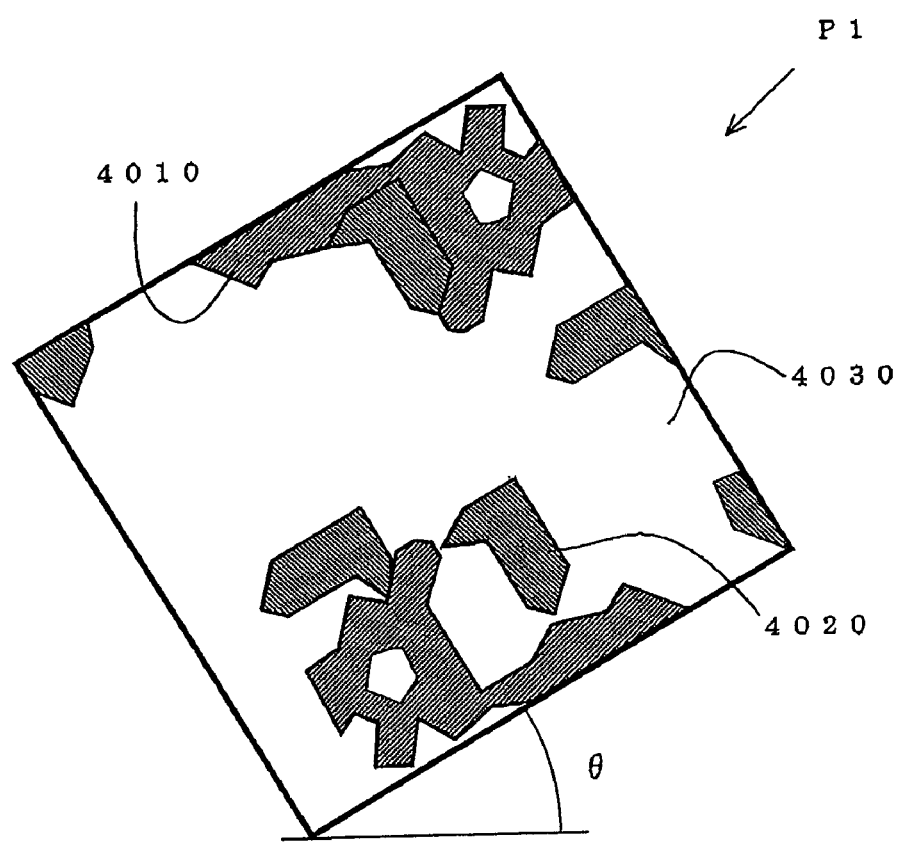
FIG. 14 is a view showing the first background image rotated by the step S1001 in FIG. 10.
Figure 15:
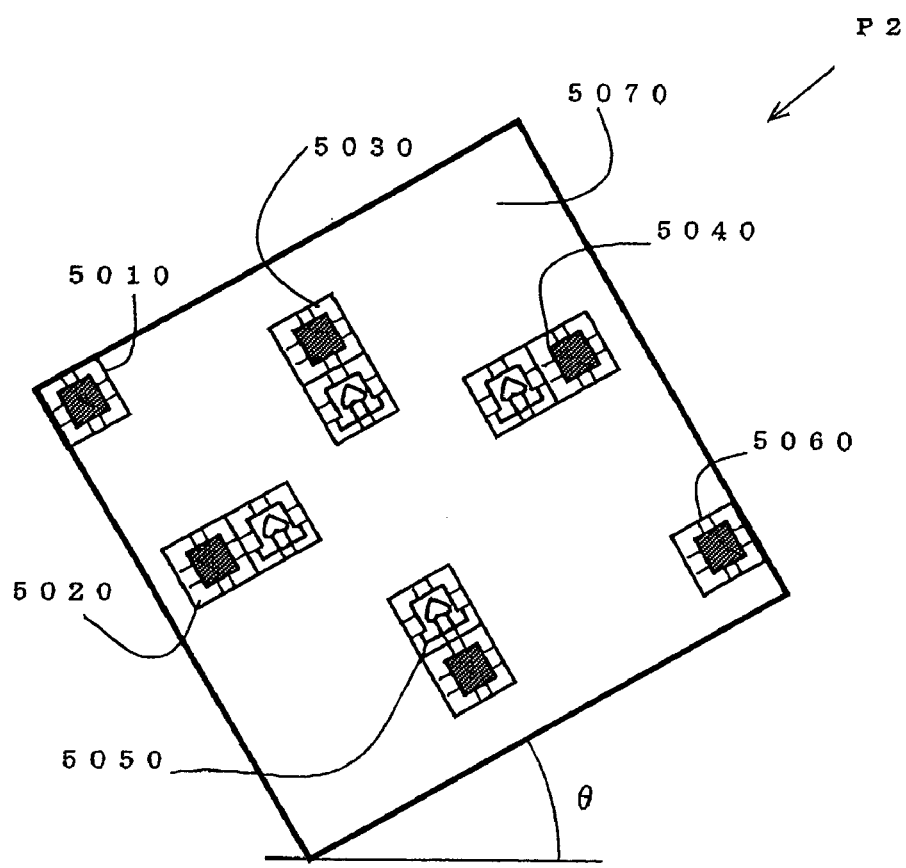
FIG. 15 is a view showing the second background image rotated by the step S1001 in FIG. 10.
Figure 16:
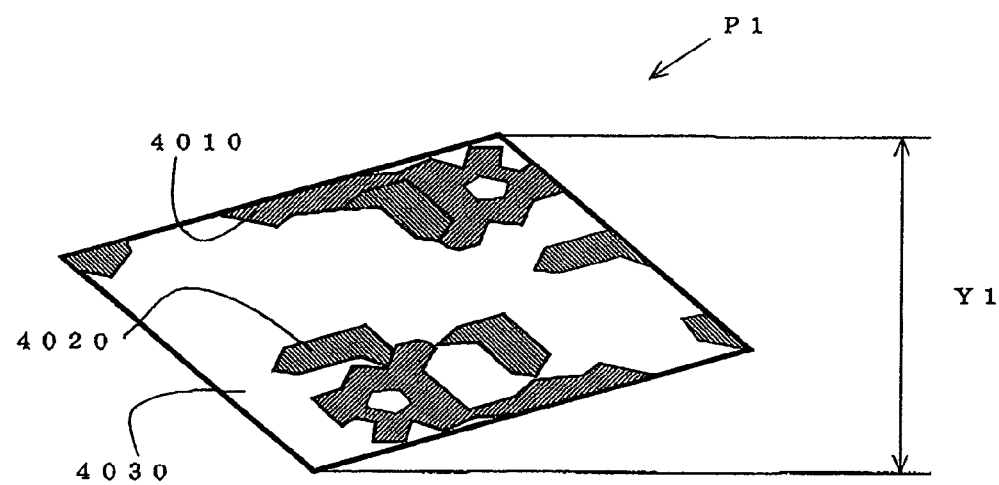
FIG. 16 is a view showing the first background image diminished in size of Y-direction by the step S1002 in FIG. 10.
Figure 17:
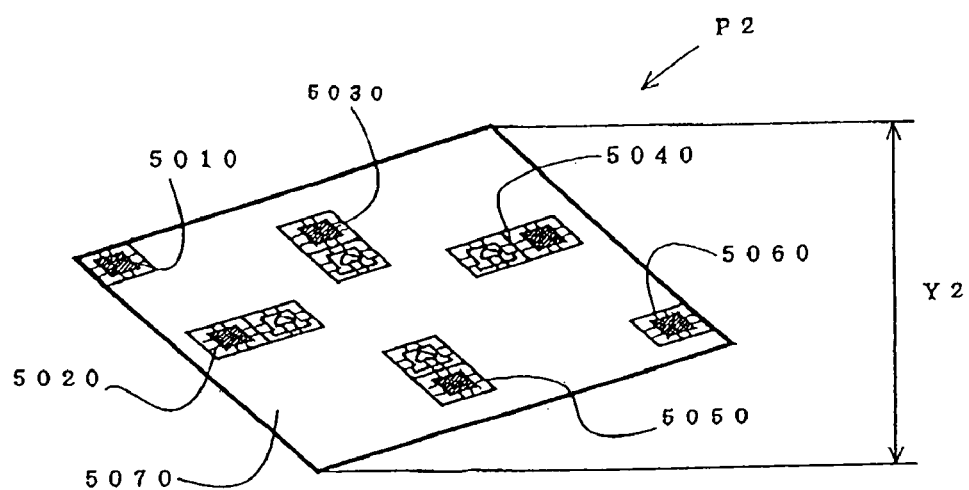
FIG. 17 is a view showing the second background image diminished in size of Y-direction by the step S1002 in FIG. 10.
Figure 18:
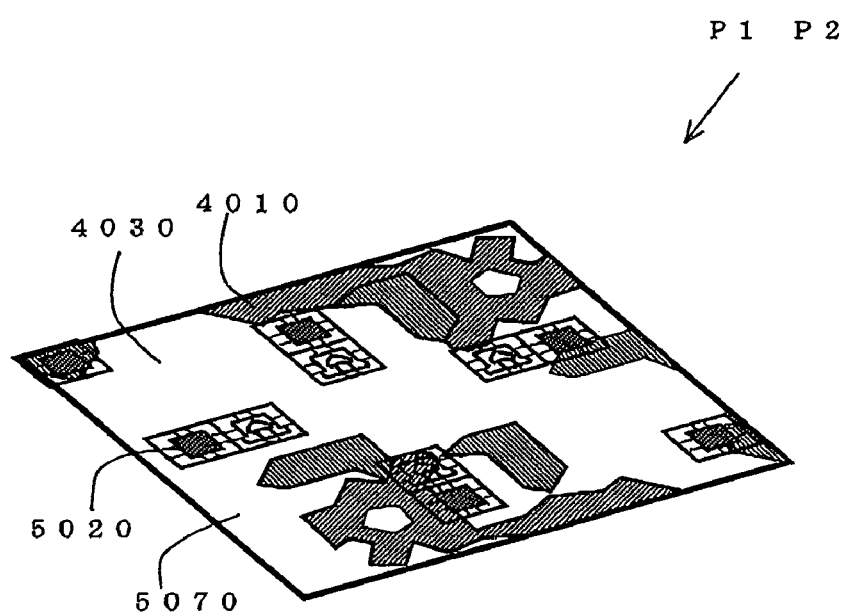
FIG. 18 is a view showing image of FIG. 16 superimposed upon the image of FIG. 17.
Figure 19:
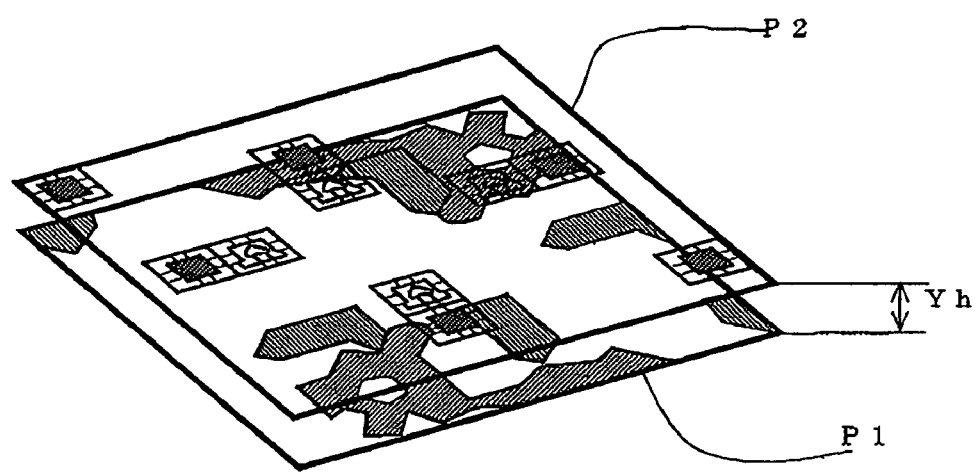
FIG. 19 is a view showing the second background image in FIG. 18, a coordinate in Y-direction of which is set by the step S1004 in FIG. 10.

FIG 9 is a view showing an image displayed by the second embodiment. FIG. 10 is a flowchart showing the second embodiment of the control program according to the present invention. FIG. 11 is a view showing the first background image processed by the control program in FIG. 10. FIG. 12 is a view showing the second background image processed by the control program in FIG. 10. FIG. 13 is a view showing a sprite image processed by the control program in FIG. 10. FIG. 14 is a view showing the first background image rotated by the step S1001 in FIG. 10. FIG. 15 is a view showing the second background image rotated by the step S1001 in FIG. 10. FIG. 16 is a view showing the first background image diminished in size of Y-direction by the step S1002 in FIG. 10. FIG. 17 is a view showing the second background image diminished in size of Y-direction by the step S1002 in FIG. 10. FIG. 18 is a view showing image of FIG. 16 superimposed upon the image of FIG. 17. FIG. 19 is a View showing the second background image in FIG. 18, coordinate in Y-direction of which is set by the step S1004 in FIG. 10, FIG. 20 is a view showing a solid body in FIG.

Figure 20:
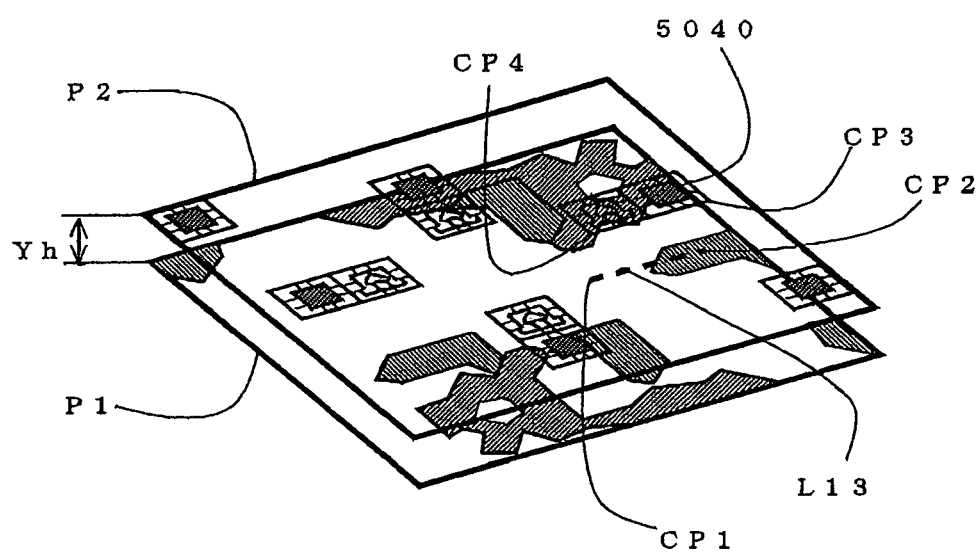
FIG. 20 is a view showing a solid body in FIG. 19, vertexes of which calculated by the step S1005 in FIG. 10 touch on the ground.
Figure 21:
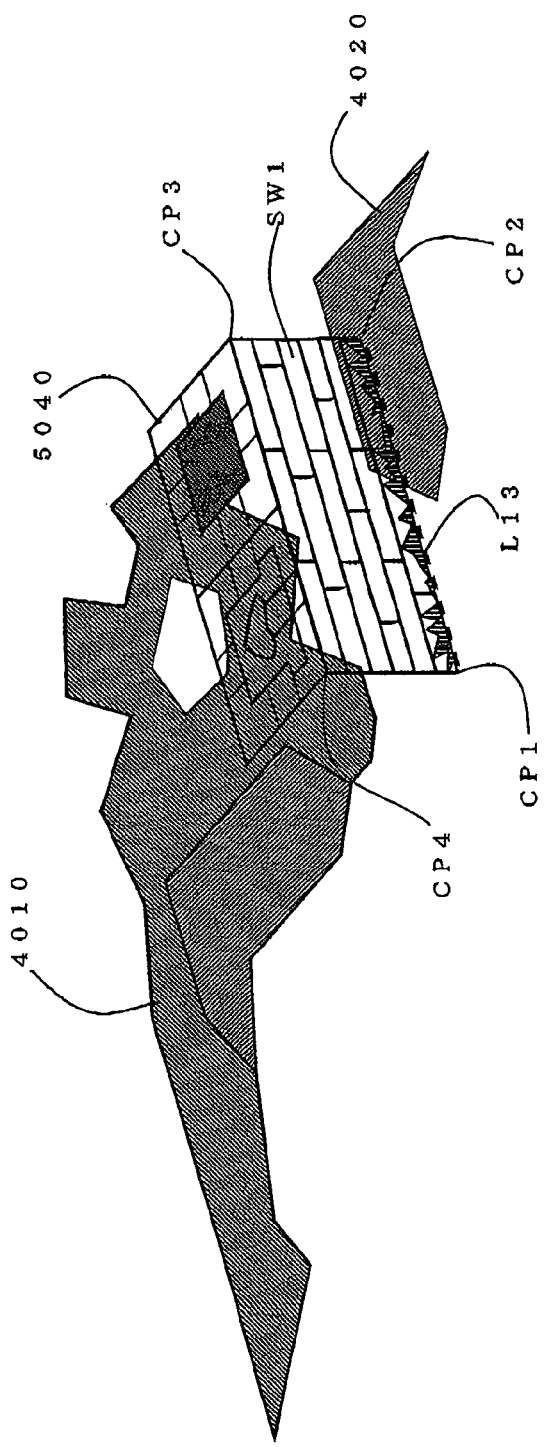
FIG. 21 is a view showing a solid bodies in FIG. 20, on one side surface of which the sprite image is pasted by the step S1006 in FIG. 10.
Figure 22:
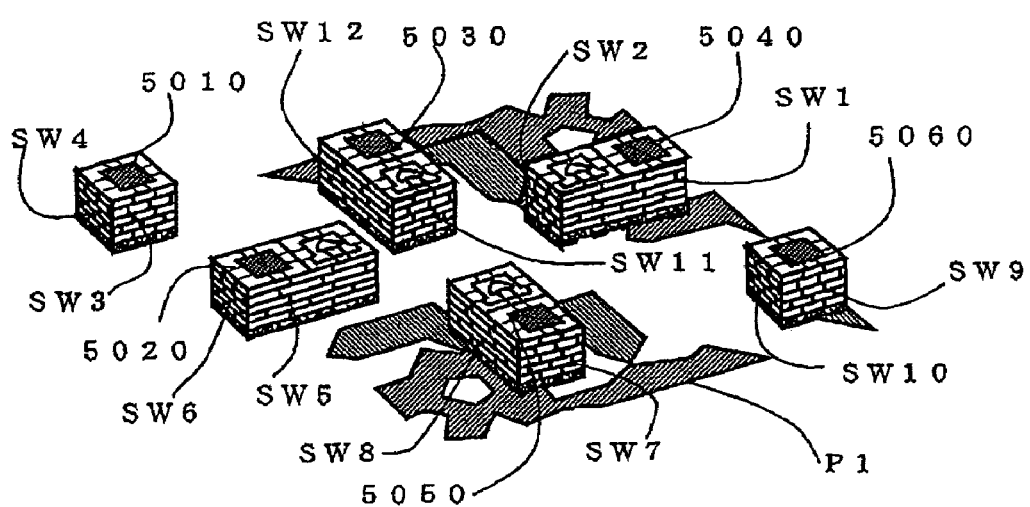
FIG. 22 is a view showing the total solid bodies in FIG. 20, on the total side surfaces of which the sprite image is pasted by the step S1006 in FIG. 10.
Figure 23:
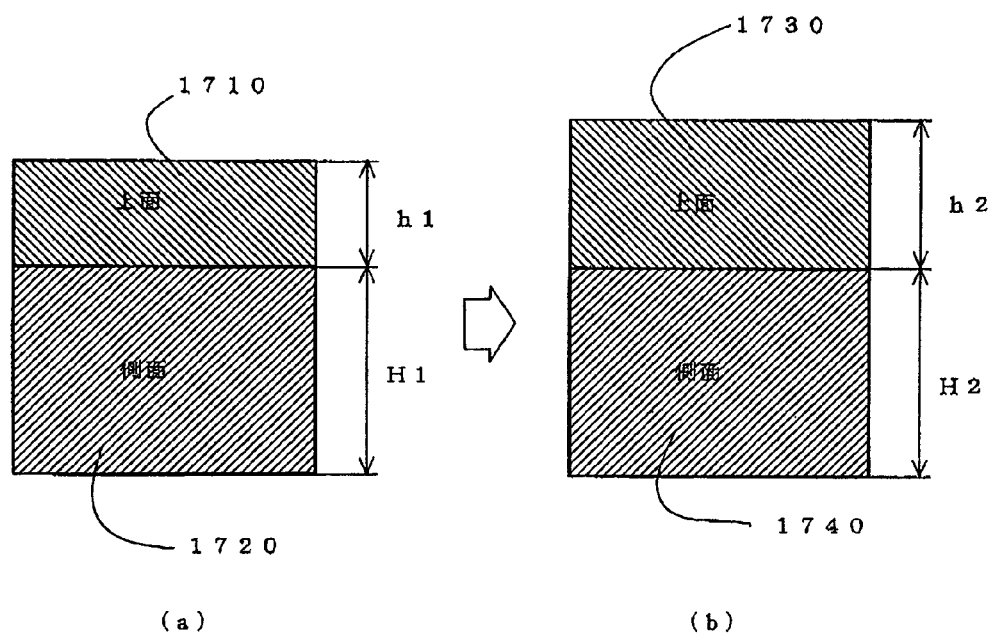
FIG. 23 is a view showing the second background image with changed size in Y-direction.
Figure 24:
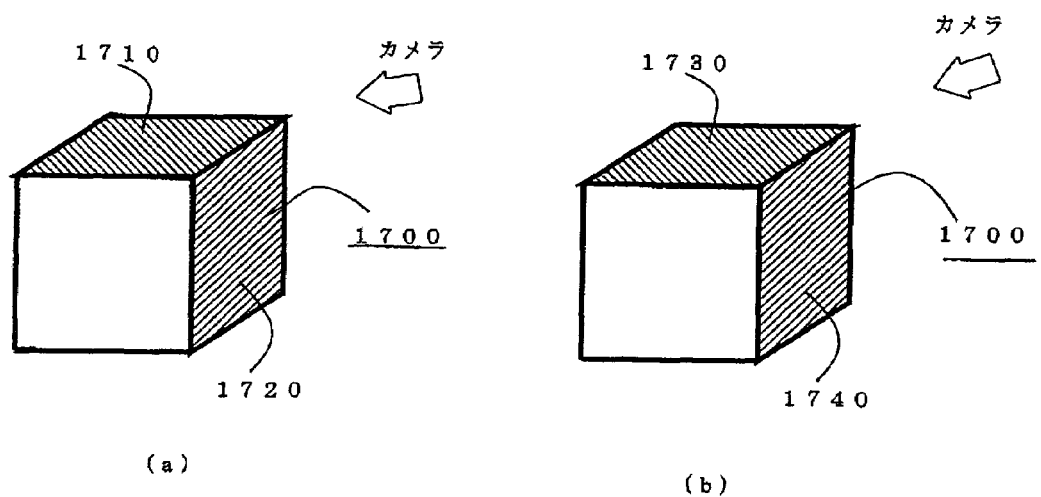
FIG. 24 is a perspective view showing an effect of the step S1003 in FIG. 10.

19 vertexes of which calculated by the step S1005 in FIG. 10 touch on the ground, FIG. 21 is a view showing a solid body in FIG. 20 on one side surface of which the sprite image is pasted by the step S1006 in FIG. 10. FIG. 22 is a view showing the total solid bodies in FIG. 20, on the total side surfaces of which the sprite image is pasted by the step S1006 in FIG. 10. FIG. 23 is a view showing the second background image with changed size in Y-direction. FIG. 24 is a perspective view showing an effect of the step S1003 in FIG. 10. FIG. 25 is a view showing an example of sprite image.

The second embodiment is executed in a game machine similarly to the first embodiment, for example, an image of FIG. 9 is displayed by the program.

In FIG. 9, two buildings 2010 and 2020 are expressed as solid bodies on the ground 2000 (the first background), further, characters 2030 and 2040 made of a sprite image, a lane 2050 and so forth are shown on the ground 2000.

As the characters 2030 and 2040 move, the buildings 2010 and 2020 are rotated and deformed, then, a powerful expression is realized as if the characters 2030 and 2040 moved lively and freely in three-dimensional apace.

A background 2060 is shown behind the ground 2000.

The game machine stores a first image plane including the first background, a second plane including images of upper surfaces (second background images) of solid bodies of buildings 2010 and 2020, a third image plane including the background 2060 (the third background) in the graphic memory 1040. Also, a sprite image to be pasted on side surfaces 2015 and 2025 of the building 2010 and 2020 and other solid bodies is stored in the graphic memory 1040.

Also, sprite images of characters etc. and various two-dimensional images are stored in the graphic memory 1040.

Since the video processor 1030 generates quickly the sprite image of parallelogram (including rectangle), the solid bodies are perpendicular or oblique pillars of the same height with a polygonal horizontal cross section, therefore, various expression of solid bodies are possible.

The perpendicular or oblique pillar is a solid body having two parallel polygonal surfaces (top and bottom surfaces) and other surfaces (side surfaces) are parallelogram. When the side surfaces are all rectangles, the perpendicular or oblique pillar is a perpendicular pillar. Other pillars are oblique pillars.

Therefore, pretended three-dimensional image expression of extremely high speed and high reality is possible, by a little image data volume of three background images.

In FIG. 10, the control program executes the following steps from S1001 to S1006.

Step S1001: A rotation angle θ of the ground (the first background) is determined, caused by the movement of the characters et., by displacement of a view point and so forth. The height of the solid bodies (perpendicular pillars) is set. The solid bodies (perpendicular pillars) have the same height.

Here, the first background P1 is as shown in FIG. 11, and the second background P2 is as shown in FIG. 12. In the image P1, a plurality of image patterns 4010 and 4020 are arranged, and the rest 4030 of the image P1 than the area of image patterns 4010 and 4020 is colored mono-chromatically.

The image P2 includes the upper surface images 5010, 5020, 5030, 5040, 5050 and 5060. The rest 5070 of the image P2, other than the area of the upper surface images 5010, 5020, 5030, 5040, 5050 and 5060, is transparent.

The third background 2060 (FIG. 9) is entirely colored mono-chromatically.

The sprite image SP to be pasted on the side surfaces is a rectangular image as shown in FIG. 13, for example. The rectangular image of FIG. 13 is deformed into various parallelograms (including rectangles) correspondingly to the size and shape of the side surfaces.

The image SP consists of brick 6010 expressing wall surface of the building and weed 6020 around the building.

Step S1002: After step S1001, deformation parameters of the ground P1 (the first background) and the upper surface P2 (the second background) are calculated. The deformation parameters correspond to the rotation angle of the ground set in the step S1001. As shown in FIGS. 14 and 15, the first and second background P1 and P2 are rotated around the predetermined reference point (center, for example) by the angle θ set in the step S1001.

Further, as shown in FIGS. 16 and 17, the first and second background images are diminished to be half (heights are Y1 and Y2, respectively) in the Y-direction (vertical in the displayed image), so that both the first and second background images can be displayed.

The magnification, i.e. diminishing degree, may be set more or less than ½ is suitable for the displaying manner of the image.

Step S1003: The characters (2030, 2040 in FIG. 9 etc.) can be operated by the input device 1140 to jump on the upper surface 5010 (FIG. 15) of the solid body. A dynamic visual effect can be obtained as if the operator jumped together with the character by process shown in FIGS. 23 and 24 after step S1002.

As shown in FIG. 24(a), when the character observed by a camera (view point) jumps relatively to the solid body 1700, the camera (view point) becomes higher and the solid body 1700 is observed from higher view point as shown in FIG. 24(b). The height change of the view point can be expressed by a difference of the ratio of heights of upper and side surfaces 1710 and 1720 before the jump and the ratio of heights of upper and side surfaces 1730 and 1740 after the jump.

Then, as shown in FIG. 23, the image display is controlled so that (h1/H1)<(h2/H2) or h1<h2, if the heights of the side surface before and after the jump are H1 and H2, respectively, and the heights of the upper surface before and after the jump are h1 and h2, respectively.

If the character does not jump, the process is advance to step S1004 without executing step S1003.

Step S1004: After step S1003, the position of the upper surface (the second background) is determined according to the height of the solid body.

If height of the solid body is zero, the images of FIGS. 16 and 17 are overlapped as shown in FIG. 18. The second background P2 is shifted by Yh in the Y-direction with respect to the first background P1 according to the height of the solid body, as shown in FIG. 19.

For clearly indicating the overlapped backgrounds, the hiding effect of the first background image P1 by the upper surface 5010 is ignored and the first background image entirely appears. The peripheral of the first and second background images are expressed by solid lines.

It is also possible that the background images P1 and P2 are displaced beforehand corresponding to the shift distance Yh in order to omit the process of shifting the background images.

Step S1005: After step S1004, the shapes of the side surfaces of the solid bodies are successively calculated. The solid bodies are perpendicular pillar and their side surfaces are parallelogram (including rectangle). Each parallelogram is calculated by determining the four vertexes thereof.

In FIG. 20, in the side surface SW1 (FIG. 21) including corner points CP3 and CP4 of the upper surface 5040, the corner points CP1 and CP2 of the bottom surface of the solid body are calculated, then the shape of side surface SW1 is determined from the corner points CP1, CP2, CP3 and CP4.

A cross line of the side surface SW1 and the ground P1 is designated by L13. The side surface displayed has a shape transformed into a coordinate corresponding to the transformation due to the rotation of the ground and other factors. The similar processing are performed for all the side surfaces of the total solid bodies.

Step S1006: After step S1005, the sprite image SP is deformed and displayed so as to fit the side surface SW1. For clearly indicating the displayed side surface SW1, the hiding effect of the ground P1 by the upper surface 5040 and side surface SW1 is ignored.

Similarly, as shown in FIG. 22, the second side surface SW2 in connection with the upper surface 5040, the side surfaces SW3 and SW4 in connection with the upper surface 5010, the side surfaces SW5 and SW6 in connection with the upper surface 5020, the side surfaces SW11 and SW12 in connection with the upper surface 5030, the side surfaces SW7 and SW8 in connection with the upper surface 5050, the side surfaces SW9 and SW10 in connection with the upper surface 5060 are displayed.

As mentioned above, quick and realistic three-dimensional expression in realized by extremely few number of background images and simple deformation of a sprite image.

According to the present invention, a realistic image expression in realized in an image display apparatus which cannot freely position four vertexes of a sprite image.

The present invention may be embodied in other specific forms without departing from its spirit or essential characteristics. The described embodiments are to be considered in all respects only as illustrative and not as restrictive. The scope of the invention is, therefore, indicated by the appended claims and their combination in whole or in part rather than by the foregoing description. All changes that come within the meaning and range of equivalency of the claims are to be embraced within their scope.

What is claimed is:

1. A computer readable medium encoded with a computer control program for controlling an image display apparatus comprising a first background image storing means for storing a first planar background image, a sprite image storing means for storing a plurality of sprite images of parallelograms, a parallelograms generating means for deforming said sprite images into predetermined parallelograms, a display means for displaying said first background image and said sprite images in a predetermined priority order, said computer readable medium encoded with a computer control program executing steps comprising:

a step for setting a uniform height of perpendicular or oblique positioned on said first background image;

a step for positioning said perpendicular or oblique positioned on said first background image;

a step for setting a reference point on said first background image;

a parallelogram generating step for fitting said sprite images deformed by said parallelogram generating means on side surfaces of said perpendicular or oblique pillars, an outline of said side surface being defined by a bottom line on said first background image, a top line opposite to said bottom line and higher than said bottom line by said uniform height, said bottom line having a first and a second end point, said top line having a third and a fourth end point, wherein said third end point is connected with said first end point by a side line and said fourth end point is connected with said second end point by a side line;

a step for rotating said first background image around said reference point; and a parallelogram deforming step for deforming said sprite images according to said rotation of said first background image;

wherein said parallelogram generating step comprises:

a step for positioning a first coordinate and a second coordinate, respectively, at said first and second end points of said bottom line;

a step for positioning a third coordinate at said third end point of said top line; and a step for deforming said sprite images so as to fit said parallelogram defined by said first, second and third coordinates and for displaying said sprite image on said side surface;

and said parallelogram deforming step comprises:

a step for positioning a fourth coordinate and a fifth coordinate, respectively at said first and second end point of said bottom line after said bottom line is moved by said rotation;

a step for positioning a sixth coordinate corresponding to said third end point after said top line is shifted as a function of said uniform height; and a step for deforming said sprite images so as to fit said parallelograms defined by said fourth, fifth and sixth coordinates and for displaying said sprite image on said side surface.

2. A computer readable medium encoded with a computer control program according to Claim 1, wherein said step of sprite image deforming and displaying said sprite image comprises steps of:

determining a first vertex among vertexes of said parallelogram and second and third vertexes adjacent to said first vertex;

deforming said sprite image by determining drawing position of pixels of said sprite image according to an angle between a first vector from said first vertex to said second vertex and a second vector from said first vertex to said third vertex; and deforming said sprite image by determining drawing position of pixels of said sprite image according to an angle between a vector from said fourth coordinate to said fifth coordinate and a vector from said fourth coordinate to said sixth coordinate.

3. A computer readable medium encoded with a computer control program according to Claim 1, wherein said image display apparatus further comprises a second background image storing means for storing a second background image;

said computer readable medium encoded with a computer control program further executing steps comprising:

rotating said second background image in an equivalent manner to said first background image; and dislocating said second background image by a predetermined distance along a direction of two vertexes of said first background image.

4. A computer readable medium encoded with a computer control program according to Claim 1, further comprising a step of diminishing said first background image rotated in a predetermined direction by a predetermined magnification.

* * * * *